United States Patent
Pecinovsky

(10) Patent No.: US 8,597,541 B2
(45) Date of Patent: Dec. 3, 2013

(54) SYNERGISTIC HOST-GUEST INTERACTIONS IN FLC MIXTURES FOR INCREASED POLARIZATION AND DECREASED SWITCHING SPEED

(75) Inventor: Cory Pecinovsky, Longmont, CO (US)

(73) Assignee: Citizen Finetech Miyota Co., Ltd., Nagano (JP)

( * ) Notice: Subject to any disclaimer, the term of this patent is extended or adjusted under 35 U.S.C. 154(b) by 0 days.

(21) Appl. No.: 13/364,920

(22) Filed: Feb. 2, 2012

(65) Prior Publication Data

US 2013/0200306 A1  Aug. 8, 2013

(51) Int. Cl.
  *C09K 19/34* (2006.01)
  *C09K 19/52* (2006.01)
  *C09K 19/06* (2006.01)
  *C09K 19/30* (2006.01)
  *C09K 19/00* (2006.01)
  *G02F 1/1333* (2006.01)

(52) U.S. Cl.
  USPC .............. 252/299.61; 252/299.01; 252/299.6; 252/299.63; 349/182; 428/1.1

(58) Field of Classification Search
  USPC .............. 252/299.01, 299.6, 299.61, 299.63; 428/1.1; 349/182
  See application file for complete search history.

(56) References Cited

U.S. PATENT DOCUMENTS

| 5,173,211 A | 12/1992 | Yamashita et al. |
| 5,273,680 A | 12/1993 | Gray et al. |
| 5,300,254 A | 4/1994 | Geelhaar et al. |
| 5,478,496 A * | 12/1995 | Gray et al. ............... 252/299.61 |

FOREIGN PATENT DOCUMENTS

| JP | 62172089 A | 7/1987 |
| JP | 2270869 A | 11/1990 |

* cited by examiner

*Primary Examiner* — Geraldina Visconti

(57) ABSTRACT

The disclosed subject matter provides a chiral host-guest composition for a ferroelectric liquid crystal mixture, the host-guest composition comprising a chiral guest compound and an achiral host compound, wherein the host-guest composition induces a greater degree of polarization in the liquid crystal mixture than is induced in the mixture with a comparable amount of the chiral guest compound in the absence of the achiral host compound. The chiral guest is a fluorinated compound comprising a aryl or heteroaryl core substituted with an alkyl chain, wherein the alkyl chain includes one or more fluorine atoms, each fluorine atom being bonded to a chiral carbon atom. The achiral host possesses a central thiadiazole core, with at least one aryl/heteroaryl wing, further substituted with alkyl or alkoxy groups.

23 Claims, 3 Drawing Sheets

SYNERGISTIC HOST-GUEST INTERACTIONS IN FLC MIXTURES FOR INCREASED POLARIZATION AND DECREASED SWITCHING SPEED

BACKGROUND

Liquid crystals have found use in a variety of electro-optical and display device applications, in particular those which require compact, energy-efficient, voltage-controlled light valves such as watch and calculator displays. Liquid crystal displays have a number of unique useful characteristics, including low voltage and low power of operation. In such displays, a thin layer of liquid crystal material is placed between glass plates and the optical properties of small domains in the layer is controlled by the application of electric fields with high spatial resolution. These devices are based upon the dielectric alignment effects in nematic, cholesteric and smectic phases of the liquid crystal compound in which, by virtue of dielectric anisotropy, the average molecular long axis of the compound takes up a preferred orientation in an applied electric field. However, since the coupling to an applied electric field by this mechanism is rather weak, the electro-optical response time of liquid crystal based displays may be too slow for many potential applications such as in flat-panel displays for use in video terminals, oscilloscopes, radar and television screens. Fast optical response times become increasingly important for applications to larger area display devices. Insufficient nonlinearity of liquid crystal based displays can also impose limitations for many potential applications.

Electro-optic effects with sub-microsecond switching speeds can be achieved using the technology of ferroelectric liquid crystals (FLCs) of N. A. Clark and S. T. Lagerwalll (1980) Appl. Phys. Lett. 36:899 and U.S. Pat. No. 4,367,924. These investigators have reported display structures prepared using FLC materials having not only high speed response (about 1,000 times faster than currently used twisted nematic devices), but which also exhibit bistable, threshold sensitive switching. Such properties make FLC based devices excellent candidates for light modulation devices including matrix addressed light valves containing a large number of elements for passive displays of graphic and pictorial information, optical processing applications, as well as for high information content dichroic displays.

Smectic C liquid crystal phases composed of chiral, non-racemic molecules possess a spontaneous ferroelectric polarization, or macroscopic dipole moment, deriving from a dissymmetry in the orientation of molecular dipoles in the liquid crystal phases (Meyer et al. (1975) J. Phys. (Les Ulis, Fr) 36:L-69). The ferroelectric polarization density is an intrinsic property of the material making up the phase and has a magnitude and sign for a given material under a given set of conditions. In ferroelectric liquid crystal display devices, like those of Clark and Lagerwall, appropriate application of an external electric field results in alignment of the chiral molecules in the ferroelectric liquid crystal phase with the applied field. When the sign of the applied field is reversed, realignment or switching of the FLC molecules occurs. This switching can be employed for light modulation. Within a large range of electric field strengths, the switching speed (optical rise time) is inversely proportional to applied field strength and polarization or dipole density (P), and directly proportional to orientational viscosity. Fast switching speeds are then associated with FLC phases which possess high polarization density and low orientational viscosity.

A basic requirement for application of ferroelectric liquid crystals in such devices is the availability of chemically stable liquid crystal materials which exhibit ferroelectric phases (chiral smectic C*) over a substantial temperature range about room temperature. In some cases, the ferroelectric liquid crystal compound itself will possess an enantiotropic or monotropic ferroelectric (chiral smectic C*) liquid crystal phase. Ferroelectric liquid crystal mixtures possessing chiral smectic C* phases with useful temperature ranges can also be obtained by admixture of chiral, nonracemic compounds, designated ferroelectric liquid crystal dopants, into a liquid crystal host material (which may or may not be composed of chiral molecules). Addition of the dopant can affect the ferroelectric polarization density and/or the viscosity of the C* phase and thereby affect the switching speed. Desirable FLC dopants are molecules which impart high ferroelectric polarization density to an FLC material without significantly increasing the orientational viscosity of the mixture.

While several useful ferroelectric liquid crystal materials (both pure compounds and mixtures) have thus been reported, optimum response times have not been achieved (theoretical limit estimated as 10-50 nsec. For this reason, new FLC materials particularly those having high polarization density and low viscosity are desirable, as are new FLC dopants which can impart desired properties to FLC materials. A useful property of FLC dopants is good miscibility in smectic C* matrix materials.

Ferroelectric liquid crystal (FLC) mixtures require that many criteria are met for use in commercial displays: e.g., wide temperature range of the SmC phase (−30° C.-80° C.), fast switching (<100 µs), optic axis rotation ~45°, long C* and N* pitch, I-N-SmA-SmC phase sequence. Typically for FLC mixtures, ferroelectricity is achieved by doping an achiral, SmC host mixture with chiral dopants. Besides inducing spontaneous polarization to the mixture, the chiral dopants have the side effect of inducing pitch in both the nematic and SmC phases. The pitch must be balanced so that length of the helix is ~4× greater than the thickness of the cell to ensure good alignment. Pitch compensators, i.e., additional chiral dopants with the opposite twisting power, are added to FLC mixtures for this purpose. Switching speed is a function of the spontaneous polarization and the viscosity for a given voltage. Since chirality is typically introduced to the mixture by branching the hydrocarbon tails of the constituent components, viscosity is also increased as the amount of chiral material is increased. Therefore, if it was possible to increase the spontaneous polarization without increasing the amount of chiral material, then one could avoid the shortcomings associated with increasing the viscosity and compensating for the pitch (and pitch compensators often act to increase viscosity themselves).

BRIEF DESCRIPTION OF THE DRAWINGS

Embodiments of the disclosed subject matter may be best understood by referring to the following description and accompanying drawings which illustrate such embodiments. The numbering scheme for the Figures included herein are such that the leading number for a given reference number in a Figure is associated with the number of the Figure. In the drawings.

DETAILED DESCRIPTION

Definitions

Figure 1:
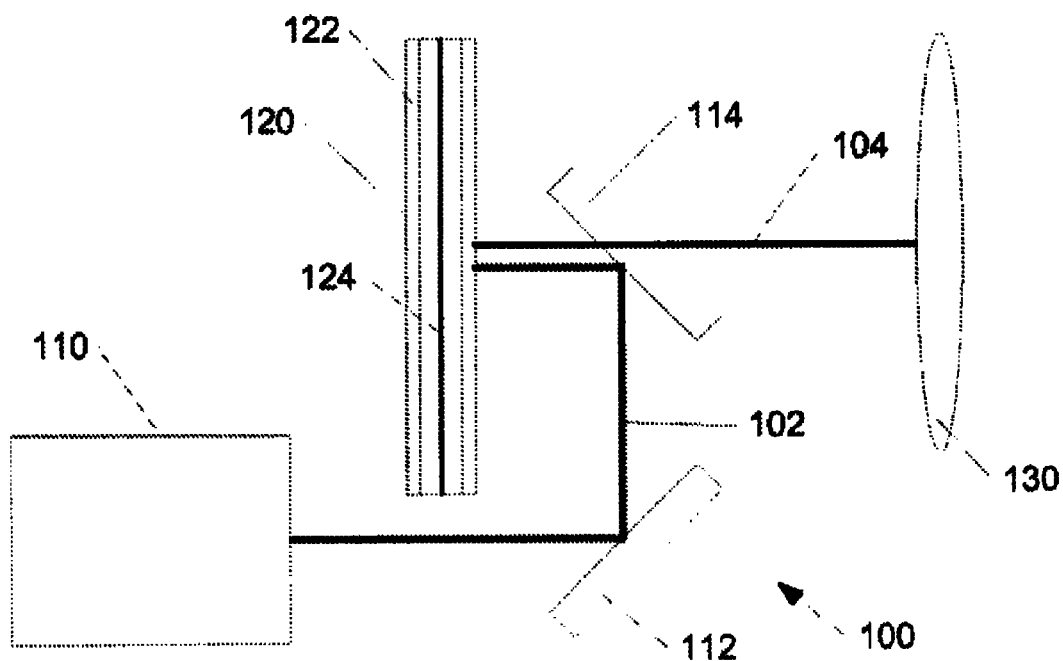
FIG. 1 illustrates an example of a liquid crystal image system according to an embodiment of the disclosed subject matter.

As used in the specification and the appended claims, the singular forms "a," "an" and "the" include plural referents unless the context clearly dictates otherwise.

The term "about" as used herein, when referring to a numerical value or range, allows for a degree of variability in the value or range, for example, within 10%, or within 5% of a stated value or of a stated limit of a range.

All percent compositions are given as weight-percentages, unless otherwise stated.

Phrases such as "under conditions suitable to provide" or "under conditions sufficient to yield" or the like, in the context of methods of synthesis, as used herein refers to reaction conditions, such as time, temperature, solvent, reactant concentrations, and the like, that are within ordinary skill for an experimenter to vary, that provide a useful quantity or yield of a reaction product. It is not necessary that the desired reaction product be the only reaction product or that the starting materials be entirely consumed, provided the desired reaction product can be isolated or otherwise further used.

By "chemically feasible" is meant a bonding arrangement or a compound where the generally understood rules of organic structure are not violated; for example a structure within a definition of a claim that would contain in certain situations a pentavalent carbon atom that would not exist in nature would be understood to not be within the claim. The structures disclosed herein, in all of their embodiments are intended to include only "chemically feasible" structures, and any recited structures that are not chemically feasible, for example in a structure shown with variable atoms or groups, are not intended to be disclosed or claimed herein.

It will be understood that when compounds of the present disclosed subject matter contain one or more chiral centers, the compounds may exist in, and may be isolated as pure enantiomeric or diastereomeric forms or as racemic mixtures. The isomers resulting from the presence of a chiral center comprise a pair of non-superimposable isomers that are called "enantiomers." Single enantiomers of a pure compound are optically active, i.e., they are capable of rotating the plane of plane polarized light. Single enantiomers are designated according to the Cahn-Ingold-Prelog system. The priority of substituents is ranked based on atomic weights, a higher atomic weight, as determined by the systematic procedure, having a higher priority ranking. Once the priority ranking of the four groups is determined, the molecule is oriented so that the lowest ranking group is pointed away from the viewer. Then, if the descending rank order of the other groups proceeds clockwise, the molecule is designated as having an (R) absolute configuration, and if the descending rank of the other groups proceeds counterclockwise, the molecule is designated as having an (S) absolute configuration. In the example in the Scheme below, the Cahn-Ingold-Prelog ranking is A>B>C>D. The lowest ranking atom, D is oriented away from the viewer.

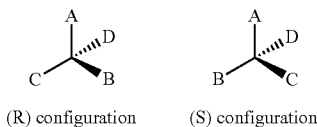

A carbon atom bearing the A-D atoms as shown above is known as a "chiral" carbon atom, and the position of such a carbon atom in a molecule is termed a "chiral center."

As to any of the groups described herein, which contain one or more substituents, it is understood, of course, that such groups do not contain any substitution or substitution patterns which are sterically impractical and/or synthetically non-feasible.

Alkyl groups include straight chain and branched alkyl groups and cycloalkyl groups having from 1 to about 20 carbon atoms, and typically from 1 to 12 carbons or, in some embodiments, from 1 to 8 carbon atoms, unless otherwise specified. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed above, for example, amino, hydroxy, cyano, carboxy, nitro, thio, alkoxy, and halogen groups.

The term "alkoxy" refers to an oxygen atom connected to an alkyl group, including a cycloalkyl group, as are defined above. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structures are substituted therewith.

When a group, e.g., an "alkyl" group, is referred to without any limitation on the number of atoms in the group, it is understood that the claim is definite and limited with respect the size of the alkyl group, both by definition; i.e., the size (the number of carbon atoms) possessed by a group such as an alkyl group is a finite number, less than the total number of carbon atoms in the universe and bounded by the understanding of the person of ordinary skill as to the size of the group as being reasonable for a molecular entity; and by functionality, i.e., the size of the group such as the alkyl group is bounded by the functional properties the group bestows on a molecule containing the group such as solubility in aqueous or organic liquid media. Therefore, a claim reciting an "alkyl" or other chemical group or moiety is definite and bounded, as the number of atoms in the group cannot be infinite.

An "aryl nucleus" is a moiety composed of one or more aryl or heteroaryl groups or combination thereof. Examples include a phenyl group, a pyridyl group, a 2-, 3-, or 4-phenylpyridyl group, and the like.

Aryl groups are cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined above. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed above.

Heteroaryl groups are aromatic ring compounds containing 5 or more ring members, of which, one or more is a heteroatom such as, but not limited to, N, O, and S; for instance, heteroaryl rings can have 5 to about 8-12 ring members, comprising one, two, three, or even more rings mutually directly bonded or fused. A heteroaryl group is a variety of a heterocyclyl group that possesses an aromatic electronic structure. A heteroaryl group designated as a $C_2$-heteroaryl can be a 5-ring with two carbon atoms and three heteroatoms, a 6-ring with two carbon atoms and four heteroatoms and so forth Likewise a $C_4$-heteroaryl can be a 5-ring with one heteroatom, a 6-ring with two heteroatoms, and so forth. The number of carbon atoms plus the number of heteroatoms sums up to equal the total number of ring atoms. Heteroaryl groups include, but are not limited to, groups such as pyrrolyl, pyrazolyl, triazolyl, tetrazolyl, oxazolyl, isoxazolyl, thiazolyl, thiadiazolyl, pyridinyl, pyrimidinyl, thiophenyl, benzothiophenyl, benzofuranyl, indolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Heteroaryl groups can be unsubstituted, or can be substituted with groups as is discussed above. Representative substituted heteroaryl groups can be substituted one or more times with groups such as those listed above.

Description

The disclosed subject matter is directed to the use of a host-guest composition in a ferroelectric liquid crystal mixture which improves the switching speed by 30%, and increases the polarization by 60%, without increasing the chiral composition. An achiral host component has been unexpectedly found to work synergistically with a chiral guest component, resulting in an increase in the polarization-inducing power of the chiral component. This allows for high polarization, fast switching mixtures to be prepared with reduced amounts of chiral materials. It was observed that when combining specific chiral dopants with certain host compounds, the polarization of the mixture could be drastically increased.

In various embodiments, the disclosed subject matter provides a chiral host-guest composition for a ferroelectric liquid crystal mixture, the host-guest composition comprising a chiral guest compound and an achiral host compound, wherein the host-guest composition induces a greater degree of polarization in the liquid crystal mixture than is induced in the mixture with a comparable amount of the chiral guest compound in the absence of the achiral host compound.

The presence of a chiral compound, such as of formula (I)

wherein $R^1$ is a linear $(C_6$-$C_{18})$alkyl chain $X^1$ is O or is a bond, AR is one or two independently selected aryl or heteroaryl rings, $X^2$ is O or is a bond, and $R^2$ is a linear $(C_6$-$C_{18})$alkyl chain substituted with one or two fluorine atoms, wherein each fluorine atom is bonded to a respective carbon atom such that a respective chiral center is present thereby, wherein the compound of formula (I) has a preponderance of a single enantiomer with respect to the one chiral center or each of the two chiral centers, in combination with an achiral host compound, a 2,5-disubstituted 1,3,4-thiadiazole or 1,3,4-oxadiazole as described herein, has been found to induce far greater polarization than in the absence of the host compound.

In various embodiments, the disclosed subject matter provides FLC mixtures, FLC devices using such mixtures, and electronic devices incorporating such FLC displays.

The disclosed subject matter is directed, in various embodiments, to host-guest compositions for inclusion in ferroelectric liquid crystal mixtures; to ferroelectric liquid crystal display devices incorporating the mixtures comprising various embodiments of host-guest compositions of the disclosed subject matter; and, to methods of making the inventive host-guest compositions.

In various embodiments, the disclosed subject matter provides a chiral host-guest composition for a ferroelectric liquid crystal mixture, the host-guest composition comprising a chiral guest compound and an achiral host compound, wherein the host-guest composition induces a greater degree of polarization in the liquid crystal mixture than is induced in the mixture with a comparable amount of the chiral guest compound in the absence of the achiral host compound. For example, the guest can be a compound comprising an aryl nucleus, the nucleus bearing an alkyl or alkoxy moiety substituted with at least one fluorine atom, wherein a position of fluorine substitution is a chiral center and the guest compound has a preponderance of a single absolute configuration at the chiral center. More specifically, the alkyl moiety can be substituted with two fluorine atoms, both positions of fluorine substitution being chiral centers and the guest compound has a preponderance of a single respective absolute configuration at each chiral center. In various embodiments, both positions of fluorine substitution can be of the same absolute configuration, either (R) or (S). In other embodiments, when there are two fluorine-bearing chiral centers, the absolute configurations can be different.

In various embodiments, the disclosed subject matter provides a host-guest composition wherein the guest compound is of formula (I)

wherein $R^1$ is a linear $(C_6$-$C_{18})$alkyl chain $X^1$ is O or is a bond, AR is one or two independently selected aryl or heteroaryl rings, $X^2$ is O or is a bond, and $R^2$ is a linear $(C_6$-$C_{18})$alkyl chain substituted with one or two fluorine atoms, wherein each fluorine atom is bonded to a respective carbon atom such that a respective chiral center is present thereby, wherein the compound of formula (I) has a preponderance of a single enantiomer with respect to the one chiral center or each of the two chiral centers.

For example, in formula (I), there can be two chiral centers, each bearing a fluorine atom, and the compound of formula (I) has a preponderance of a respective single absolute configuration at each of the two chiral centers. More specifically, the enantiomeric purity of the chiral guest compound can be at least about 80%, or at least about 90%, or at least about 98%.

In various embodiments, a host-guest composition of the disclosed subject matter can have a formula (II)

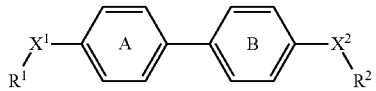

wherein $R^1$, $X^1$, $R^2$, and $X^2$ are as defined above, and wherein ring A and ring B are each independently an aryl or heteroaryl ring. More specifically, one of ring A and ring B can be phenyl and the other can be a 2-pyridyl or a 3-pyridyl group.

The sidechain comprising the fluorine-bearing chiral centers can be a group of formula —$(CH_2)_m$—CHF—CHF—$(CH_2)_n CH_3$ wherein m is 1 to about 5 and n is 1 to about 10. Each of the carbon atoms bearing fluorine in the vicinal difluoride can be chiral, as shown for the embodiment wherein the guest compound is of formula

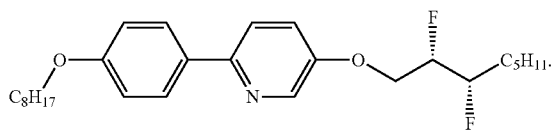

In this exemplary compound, the absolute configuration at each of the fluorine-bearing chiral centers is (S). In other embodiments, the same compound, but with each of the chiral centers being of the (R) absolute configuration, is present.

In various embodiments, the host compound of the inventive host-guest composition is a 2,5-disubstituted 1,3,4-thiadiazole or 1,3,4-oxadiazole. It is believed that the host complexes the guest by means of hydrophobic and aromatic stacking interactions between comparable domains of host and guest. The mechanism by which the increase in polarization is achieved by the presence of the host-guest complex is at present not known, but it is possible that in the complexed state, the chiral guest can achieve a conformation that is not readily accessible to the uncomplexed chiral guest. As shown in Tables 1-3, below, comparable FLC mixtures, one containing the inventive host-guest complex and the other containing the same ingredients but lacking the achiral host, the FLC mixture of the disclosed subject matter provides about a 65% higher degree of polarization, and an almost 30% decrease in switching speed, compared to the art composition.

In various embodiments, the host compound is of formula (III-S)

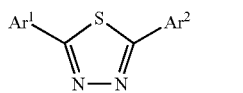

or (III-O)

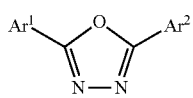

wherein $Ar^1$ and $Ar^2$ are independently $(C_1-C_{12})$alkyl, $(C_3-C_8)$cycloalkyl, $(C_3-C_8)$cycloalkyl-$(C_1-C_{12})$alkyl, para-$(C_1-C_{12})$alkylaryl, para-$(C_1-C_{12})$alkylheteroaryl, para-$(C_1-C_{12})$alkoxyaryl, or para-$(C_1-C_{12})$alkoxyheteroaryl groups, provided that only one of $Ar^1$ and $Ar^2$ is $(C_1-C_{12})$alkyl. The host compound need not be symmetrically substituted. In various embodiments, the host compound possesses an aryl or heteroaryl group bonded to the 2- and 5-positions of the central heterocycle, each of these $Ar^1$ and $Ar^2$ aryl/heteroaryl groups being substituted with an alkyl chain, which can be disposed para to the position of the aryl or heteroaryl group bonded to the central thiadiazole or oxadiazole. In various embodiments, $Ar^1$ and $Ar^2$ are independently para-$(C_1-C_{12})$alkylphenyl or para-$(C_1-C_{12})$alkoxyphenyl. In other embodiments, one of $Ar^1$ and $Ar^2$ can be $(C_1-C_{12})$alkyl. In the embodiments of either the alkyl or the alkoxy substituted aryl/heteroaryl $Ar^1$ and $Ar^2$ wings, the alkyl, or the alkyl group of the alkoxy, can be n-alkyl groups, that is, unbranched. In various embodiments, n-alkyl groups of about 5 to about 9 carbon atoms can be present, either directly bonded to the wing aryl/heteroaryl groups, or bonded via an oxygen atom.

For example, the host compound can be

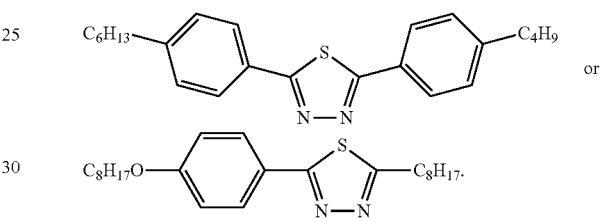

In this embodiment, both alkyl chains are n-alkyl groups, bonded to the para positions of the $Ar^1$ and $Ar^2$ phenyl rings, which are in turn bonded to the 2- and 5-positions of the central thiadiazole.

In various embodiments, the disclosed subject matter provides a ferroelectric liquid crystal mixture comprising a host-guest composition of the disclosed subject matter. An example of such a FLC mixture is shown in Table 1, below. As can be seen in Table 3, below, a mixture of the disclosed subject matter can have a greater degree of polarization, or a faster switching speed, or both, compared to a comparable ferroelectric liquid crystal composition lacking a host-guest composition of the present disclosed subject matter.

As shown in Table 3, mixtures of Table 1 and Table 2 exhibit markedly different properties, the inventive composition of Table 1 exhibiting increased polarization and decreased switching speeds at comparable concentrations of the expensive chiral ingredient. The mixture of Table 1 contains 10% of the thiadiazole and 10% of the chiral difluoro compound. The mixture of Table 2 contains a non-complexing substitute for the thiadiazole. Both mixtures posses a similar A-C transition and similar tilt (Table 3). However, the mixture of Table 1, having 10% of the exemplary thiadiazole instead of a comparable concentration of a non-complexing ingredient (the second component listed in Table 2), results in a 42% increase in the switching speed. The polarization of the FLC mixture of Table 1 is 65% higher than of the FLC mixture of Table 2, in spite of the chiral composition being identical.

To rule out the possibility of increased tilt being responsible for the increase in polarization, the saturated optic axis rotation was compared in thick cells (1.8 μm) at high voltage (25V). The difference between the two mixtures was only ~2.5°. Therefore the increase in polarization is likely due to a synergy between the chiral difluoro compound and the thiadiazole of Table 1, with the thiadiazole encouraging a more favorable conformation of the chiral difluoro compound than is present in the mixture of Table 2. This effect was found to be general for thiadiazole hosts being in combination with the chiral difluoro compounds, showing similar increases in polarization. By combining these two classes of compounds in FLC mixtures, the polarization can be dramatically increased without the increase in viscosity or need to compensate pitch. This results in much higher performing mixtures, with switching speeds being improved by at least 30%.

In various embodiments, the disclosed subject matter provides a ferroelectric liquid crystal display comprising a composition or an FLC mixture of the disclosed subject matter. Such a display system, well known in the art, is described below and in FIGS. 1-3. For example, an electronic display device comprising the host-guest composition of the disclosed subject matter, or a ferroelectric liquid crystal mixture of the disclosed subject matter, or the liquid crystal display of the disclosed subject matter, is provided in various embodiments herein. An electronic display device of the disclosed subject matter can be a component, for example, of a cell phone, a smart phone, a tablet, or a computer display screen.

Syntheses of Host-Guest Composition Components
Host Compound Synthesis

Scheme 1, below, shows an exemplary synthetic route to a host compound suitable for formation of a host-guest composition of the disclosed subject matter wherein the central ring is a thiadiazole. It is within ordinary skill to select appropriate reagents to vary the $Ar^1$ and $Ar^2$ reagents to provide thiadiazole compounds across the scope of the disclosed genus. The analogous oxadiazoles can be made by treatment of the final intermediate diacylhydrazide shown in Scheme 1 with a dehydrative reagent such as $P_2O_5$ or the like. For example, $P_2O_5$ in diglyme, 110-120° C., 24 hr, is effective in formation of the oxadiazole in the Scheme 1, below, from the diacylhydrazide intermediate.

4-Hexyloxybenzohydrazide (6.0 g, 25.4 mmol) was dissolved in pyridine (50 mL) in a 250 mL RBF and 4-pentylbenzoyl chloride 5.62 g, 26.7 mmol) was added via syringe. The reaction was heated to reflux for 2.5 h. After cooling to room temperature, 10% HCl solution (100 mL) was added and the product was filtered and washed with cold $H_2O$ (50 mL) and cold methanol (50 mL). Recrystallization from methanol afforded the product as a white solid. Yield was 6.63 g, 72%.

4-Hexyloxy-4'-pentylbenzodihydrazide (3.0 g, 7.307 mmol) was dissolved in THF (30 mL) in a 100 mL RBF and Lawesson's Reagent (3.4 g, 8.40 mmol) was added. The reaction was heated to reflux overnight. After cooling to room temperature, 15% NaOH solution (30 mL) was added and the product was extracted with $CH_2Cl_2$ (3×50 mL), washed with brine (30 mL), dried ($MgSO_4$), and filtered. Evaporation of the solvent afforded the crude product as a yellow solid. Purification by column chromatography ($SiO_2$) using 5% $CH_2Cl_2$/5% ethyl acetate/90% hexanes as the eluent afforded the product as a white solid which was further purified by recrystallization from methanol. Yield was 1.95 g, 65%.

Synthesis of Chiral Fluorinated Guest Compounds

Methods of preparation of the guest chiral fluorinated compounds are described in U.S. Pat. No. 5,380,460, which is incorporated herein in its entirety. For example, Scheme XII therein describes the preparation of the exemplary guest compound:

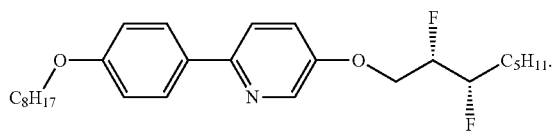

Schemes I-IV as shown in U.S. Pat. No. 5,380,460 describe the preparation of various chiral mono- and difluoroalkoxy

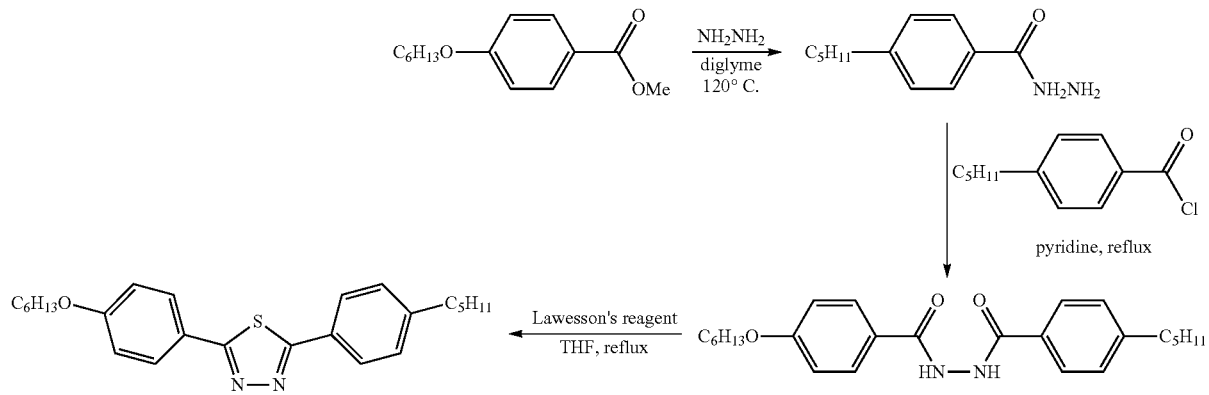

4-Hexyloxy-methylbenzoate (5.0 g, 24.2 mmol) was dissolved in diglyme (8 mL) in a 25 mL RBF. Hydrazine (3.83 mL, 121 mmol) was added and the reaction was heated to 120° C. for 3 h. The reaction was cooled to room temperature and $H_2O$ (20 mL) was added and the product was extracted with a 1:1 mixture of hexanes/ethyl acetate (3×30 mL), washed with brine (30 mL), dried ($MgSO_4$), filtered and rotovapped to afford the crude product. Suspending the crude product in hexanes and filtering gave the product was a pure white solid (4.42 g, 88%).

sidechain reagents, which can be converted to, e.g., tosylates, suitable for alkylation of an aryloxy group to form a mono- or difluoroalkoxyaryl or heteroaryl, or for alkylative coupling to provide a mono- or difluoroalkylaryl or heteroaryl, such as by palladium catalyzed coupling with an aryl or heteroaryl boronic acid, such as is well known in the art. Other procedures are described therein enabling the synthesis of the chiral guest compounds shown herein as components of the inventive host-guest composition.

Properties of Ferroelectric Liquid Crystal Mixtures Containing Host-Guest Compositions It is not necessary to preform the host-guest composition of the disclosed subject matter prior to formulating the ferroelectric liquid crystal (FLC) mixture to be used. However, the host and guest compounds can be premixed prior to addition to the other FLC components, and liquid crystal display systems prepared as are well known in the art. See, for example, U.S. Pat. No. 5,380,460.

Example 1

An exemplary FLC mixture comprising a host-guest composition of the disclosed subject matter, and an art FLC mixture are shown in Tables 1 and 2, respectively, below.

TABLE 1

Exemplary FLC Mixture Comprising a Host-Guest Composition of the Disclosed subject matter

| Structure of FLC Component | Weight (mg) | Weight % |
|---|---|---|
| 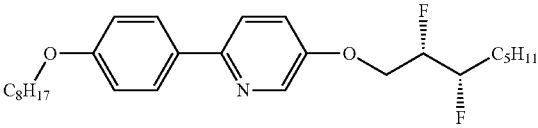<br>guest: $C_{27}H_{39}F_2NO_2$ MW 447 | 1.00 | 10.03 |
| 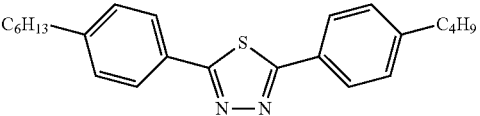<br>host: $C_{24}H_{30}N_2S$ MW 378 | 0.99 | 9.030 |
| 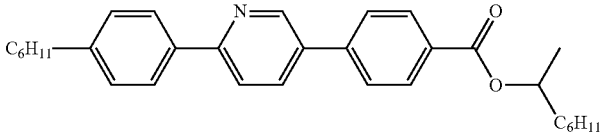 | 0.59 | 5.918 |
| 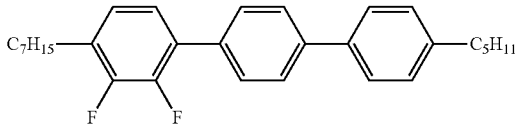 | 1.20 | 12.036 |
| 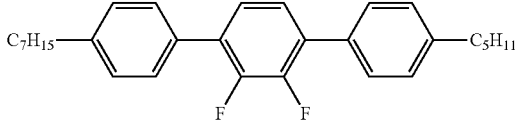 | 0.95 | 9.529 |
| 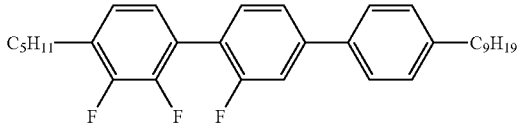 | 2.6 | 26.078 |
| 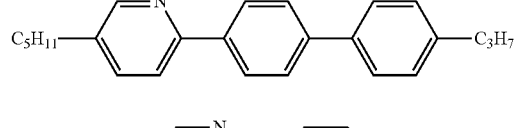 | 1.16 | 11.635 |
|  | 1.48 | 14.845 |

TABLE 2

Comparative FLC Mixture

| Structure of FLC Component | Weight (mg) | Weight % |
|---|---|---|
| $C_8H_{17}O$–(phenyl)–(pyridyl-N)–$O$–$CH_2CHF$–$CHF$–$C_5H_{11}$ | 1.01 | 9.970 |
| $C_8H_{17}O$–(phenyl)–(phenyl-F,F)–(phenyl)–$CH_2CH_2C(CH_3)_3$ | 0.95 | 9.378 |
| $C_6H_{11}$–(phenyl)–(pyridyl-N)–(phenyl)–$C(O)O$–$CH(CH_3)$–$C_6H_{11}$ | 0.58 | 5.726 |
| $C_7H_{15}$–(phenyl-F,F)–(phenyl)–(phenyl)–$C_5H_{11}$ | 1.31 | 12.932 |
| $C_7H_{15}$–(phenyl)–(phenyl-F,F)–(phenyl)–$C_5H_{11}$ | 0.99 | 9.773 |
| $C_5H_{11}$–(phenyl-F,F)–(phenyl-F)–(phenyl)–$C_9H_{19}$ | 2.52 | 24.877 |
| $C_5H_{11}$–(pyridyl-N)–(phenyl)–(phenyl)–$C_3H_7$ | 1.18 | 11.649 |
| $C_8H_{17}O$–(pyrimidyl-N,N)–(phenyl)–$OC_6H_{13}$ | 1.59 | 15.696 |

Table 3, below, shows a comparison of the FLC-related physical properties of the FLC mixture comprising the host-guest composition of the disclosed subject matter, Table 1, and the comparative composition lacking the host component, Table 2.

TABLE 3

FLC-related Physical Properties of FLC Mixtures of Tables 1 and 2

| Mixture | Phase Sequence | Polarization nC/cm2 | Switching Speed T95 0.8 μm, 1.8 V, 25° C. | Optical axis rotation 0.8 μm, 1.8 V, 25° C. | Optical axis rotation 1.8 μm, 25 V, 25° C. |
|---|---|---|---|---|---|
| Table 1 | I-113.0-N-103.7-A-91.1-C | 68.2 | 120 μs | 43.2° | 65.0° |
| Table 2 | I-110.0-N-102.8-A-89.2-C | 41.3 | 170 μs | 40.4° | 60.5° |

As can be seen in Table 3, when the host-guest composition is present in the FLC mixture, under comparable conditions and with closely similar amounts of other FLC mixture components, the FLC mixture of Table 1 provides about a 65% increase in polarization and about a 30% decrease in switching speed compared to the art composition of Table 2.

Example 2

The following host mixture was prepared:

TABLE 4

Exemplary Host Mixture B

| Structure of FLC Component | MW | wt % |
|---|---|---|
| (thiadiazole with $C_8H_{17}$ and $C_5H_{11}$) | 344 | 30.00 |
| (thiadiazole with $C_8H_{17}O$ and $C_8H_{17}$) | 392 | 29.70 |
| (thiadiazole with $C_6H_{13}$ and $C_8H_{17}$) | 434 | 20.07 |
| (thiadiazole with $C_6H_{13}$ and $C_5H_{11}$) | 392 | 20.23 |

This host mixture B defined in Table 4 has a room temperature SmC phase, and makes for facile measurements when adding chiral dopants. The chiral difluoro compound 950

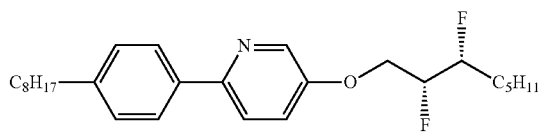

was added at various doping levels, and the polarization for each mixture was measured. The polarization power $\delta_p$ was calculated according to the following formula, which normalizes for tilt (Xd=mol fraction of chiral dopant, Ps=measured polarization):

$$\delta_P = \left(\frac{dP_o(x_d)}{dx_d}\right)_{x_d \to 0}$$

$$P_o = P_S / \sin\theta$$

Figure 4:
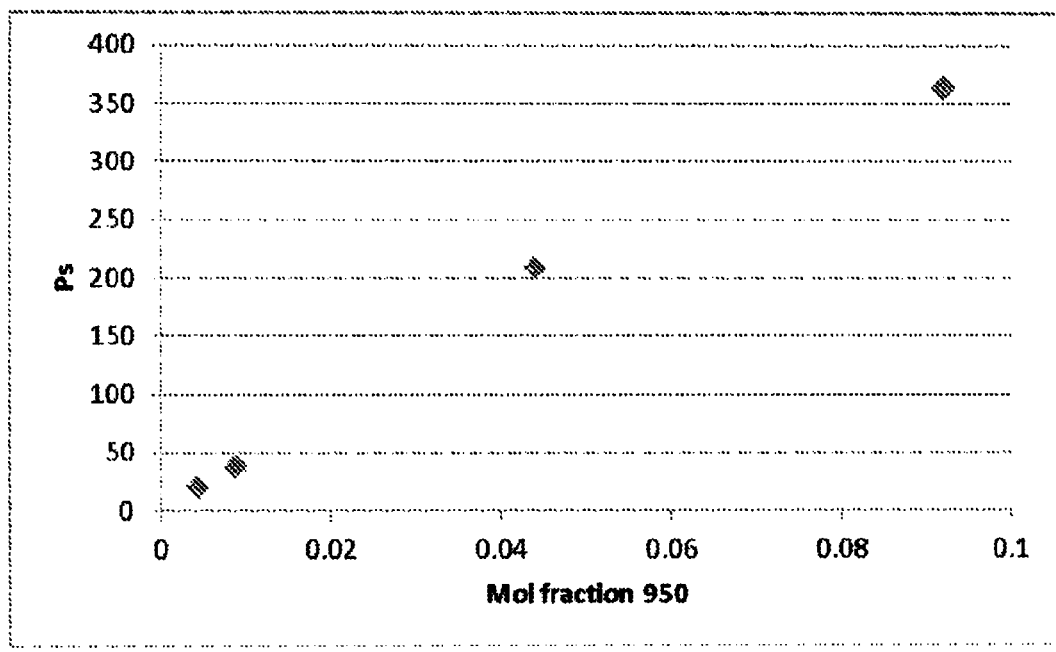
FIG. 4 illustrates an example graph of Mole Fraction of Chiral Guest 950 in Host Mixture B according to an embodiment of the disclosed subject matter.

FIG. 4 is a graph of Mole Fraction of Chiral Guest 950 in Host Mixture B.

The slope of the line with the first three data points is linear, and is δ=4798 nC/cm^2.

Comparing this polarization power of compound 950 (above) obtained in a host mixture consisting entirely of thiadiazoles to the polarization power obtained in a host 1:1 mixture of the two phenylpyrimidines shown below, the difference is substantial: 4798 vs 733-an increase of 6x-7x.

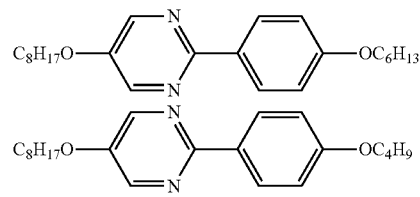

Ferroelectric Liquid Crystal Devices

Figure 2:
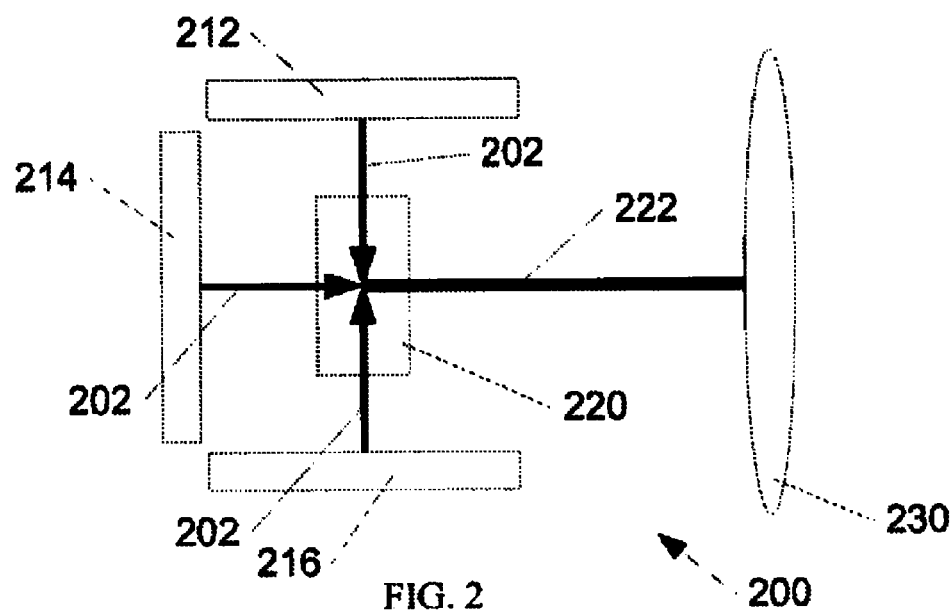
FIG. 2 illustrates another example of a liquid crystal image system according to an embodiment of the disclosed subject matter.
Figure 3:
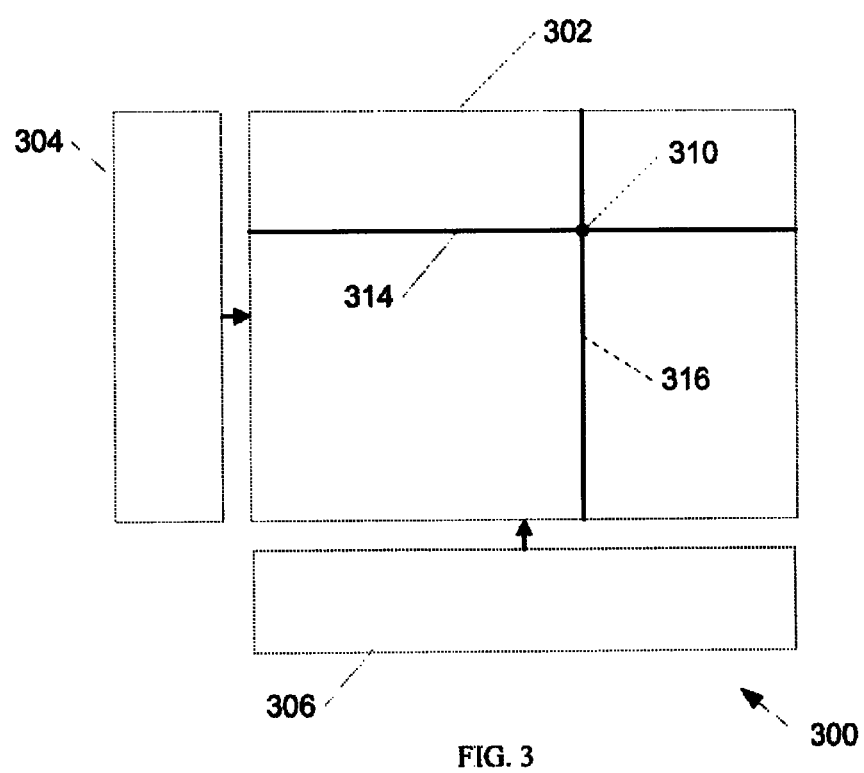
FIG. 3 illustrates an example of a liquid crystal device according to an embodiment of the disclosed subject matter.

FIGS. 1-3 illustrate some examples of liquid crystal display devices that include liquid crystalline compositions of the present disclosure. FIG. 1 shows a liquid crystal image system 100. In one example, the liquid crystal image system 100 includes a projector system. In one example, the liquid crystal image system 100 includes a screen display system.

The liquid crystal image system 100 includes a light source 110 that provides a light beam 102. The light beam 102 may include a broad spectrum of colors. In one example, only a single color is generated by the light source 110. In one example, different single colors may be provided in rapid succession. In such a configuration, multiple successive single colors are perceived together by a user to form various color combinations or shades of color. In other examples, multiple light sources 110 each concurrently provide a single color light beam 102 (e.g. red, green, blue), that when combined, are perceived together by a user to form various color combinations or shades of color.

A liquid crystal device 120 is included in the system 100 to interact with the light beam 102 and selectively control amounts of light in a resulting image beam 104. A plurality of layers 122 are shown making up the liquid crystal device 120. Examples of layers 122 in the liquid crystal device 120 include, but are not limited to, polarizing layers, reflective layers, textured layers, and electrode layers. FIG. 1 further shows a liquid crystalline material 124 formed from a ferroelectric liquid crystal mixture as described in the present disclosure.

Ferroelectric liquid crystal mixtures of the present disclosed subject matter may include a number of desirable properties for use in liquid crystal image systems 100. Examples of ferroelectric liquid crystal mixtures as described exhibit faster switching properties than other nematic liquid crystal materials. Fast switching of individual pixels may enable configurations where rapid succession of individual single colors combine to produce full color on each pixel. Examples of ferroelectric liquid crystal mixtures as described may also exhibit bistable crystalline states. Liquid crystal image systems using bistable ferroelectric liquid crystal mixtures may use less power than other liquid crystal image systems, such as active matrix systems. Once a desired state within the ferroelectric liquid crystal mixture is activated, the bistability of the mixture does not require additional power to maintain the selected state.

In one example, the liquid crystal device 120 includes a semiconductor array. In one example, the semiconductor array includes a silicon array that has been processed to include structure for a number of pixels. Examples of semiconductor arrays may include active matrix liquid crystal configurations or passive matrix liquid crystal configurations. The system 100 shown in FIG. 1 illustrates a reflective liquid crystal device 120, although the disclosed subject matter is not so limited. One example of a reflective liquid crystal device 120 includes a Liquid Crystal on Silicon (LCOS) device. Other examples of liquid crystal devices 120 include transmissive configurations where the light 102 selectively passes through the liquid crystal devices 120 depending on a state of individual pixels in the liquid crystal device 120. In the reflective system 100 shown, a first minor 112 and a second mirror 114 are included to direct the light 102 towards the liquid crystal device 120. In selected examples, as shown in FIG. 1, the image beam 104 passes through the second mirror 114, and interacts with optics 130 to project an image formed by the liquid crystal device 120.

FIG. 2 shows another example of a liquid crystal image system 200. In the system 200, multiple liquid crystal devices are used to produce an image beam 222. FIG. 2 shows a first liquid crystal device 212, a second liquid crystal device 214, and a third liquid crystal device 216. In one example, the liquid crystal devices 212, 214, 216 include elemental colors such as red, green and blue. Component light beams 202 of individual colors are mixed in the liquid crystal image system 200 in a prism 220 to provide the image beam 222.

In one example, one or more of the liquid crystal devices 212, 214, 216 are transmissive. In another example, one or more of the liquid crystal devices 212, 214, 216 are reflective. In one example, multiple light sources (not shown) provide individual component colors such as red, green, and blue for each of the liquid crystal devices 212, 214, 216. In one example, a single light source (not shown) is split using prisms or other splitting devices to divide the light source into component colors that are later re-combined in the prism 120 after modification using the liquid crystal devices 212, 214, 216. Similar to the example illustrated in FIG. 1, in one example, the image beam 222 also interacts with optics 230 to project an image formed by a combined output of the liquid crystal devices 212, 214, 216.

FIG. 3 shows a simplified diagram of a liquid crystal device 300 similar to the liquid crystal devices shown in FIGS. 1 and 2. An array 302 is provided including a number of rows 314 and columns 316. A pixel 310 within the array 302 is defined at an intersection of a given row 314 and column 316. A row controller 304 and a column controller 306 are shown coupled to the array 302. In operation, the row controller activates a desired row 314, and the column controller 306 activates a desired column 316 to select the pixel 310. Progressive activation of successive columns 316 along a given row 314 produces a line within a generated image. Further progressive activation of successive rows and columns generate multiple lines in a progression to generate the full image.

All patents and publications referred to herein are incorporated by reference herein to the same extent as if each individual publication was specifically and individually indicated to be incorporated by reference in its entirety.

The terms and expressions which have been employed are used as terms of description and not of limitation, and there is no intention that in the use of such terms and expressions of excluding any equivalents of the features shown and described or portions thereof, but it is recognized that various modifications are possible within the scope of the disclosed subject matter claimed. Thus, it should be understood that although the present disclosed subject matter has been specifically disclosed by preferred embodiments and optional features, modification and variation of the concepts herein disclosed may be resorted to by those skilled in the art, and that such modifications and variations are considered to be within the scope of this disclosed subject matter as defined by the appended claims.

What is claimed is:

1. A chiral host-guest composition for a ferroelectric liquid crystal mixture, the host-guest composition comprising a chiral guest compound and an achiral host compound, wherein the host-guest composition induces a greater degree of polarization in the liquid crystal mixture, per mass, than is induced in the mixture of the chiral guest compound in the absence of the achiral host compound, per mass,
wherein the weight percentage of the achiral host compound is 6% or more.

2. The host-guest composition of claim 1 wherein the guest is a compound comprising an aryl nucleus, the nucleus bearing an alkyl or alkoxy moiety substituted with at least one fluorine atom, wherein a position of fluorine substitution is a chiral center.

3. The host-guest composition of claim 2 wherein the alkyl moiety of the guest is substituted with two fluorine atoms, both positions of fluorine substitution being chiral centers.

4. The host-guest composition of claim 3 wherein both positions of fluorine substitution are of the same absolute configuration.

5. The host-guest composition of claim 1 wherein the guest compound is of formula (I)

wherein $R^1$ is a linear ($C_6$-$C_{18}$)alkyl chain $X^1$ is O or is a bond, AR is one or two independently selected aryl or heteroaryl rings, $X^2$ is O or is a bond, and $R^2$ is a linear ($C_6$-$C_{18}$)alkyl chain substituted with one or two fluorine atoms, wherein each fluorine atom is bonded to a respective carbon atom such that a respective chiral center is present thereby.

6. The host-guest composition of claim 5, wherein for the compound of formula (I) there are two chiral centers, each bearing a fluorine atom.

7. The host-guest composition of claim 1 wherein the enantiomeric purity of the chiral guest compound is at least about 80%, or more.

8. The host-guest composition of claim 5 wherein the guest compound is of formula (II)

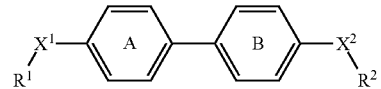

wherein $R^1$, $X^1$, $R^2$, and $X^2$ are as defined in claim 5, and wherein ring A and ring B are each independently an aryl or heteroaryl ring.

9. The host-guest composition of claim 8 wherein for the guest compound one of ring A and ring B is phenyl and the other is a 2-pyridyl or a 3-pyridyl.

10. The host-guest composition of claim 5 wherein for the guest compound $R^2$ is a group of formula —$(CH_2)_m$—CHF—CHF—$(CH_2)_n CH_3$ wherein m is 1 to about 5 and n is 1 to about 10.

11. The host-guest composition of claim 1 wherein the guest compound is of formula

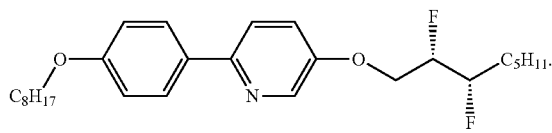

12. The host-guest composition of claim 1 wherein the host compound is a 2,5-disubstituted 1,3,4-thiadiazole or 1,3,4-oxadiazole.

13. The host-guest composition of claim 12 wherein the host compound is of formula (III-S)

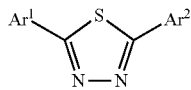 (III-S)

or (III-O)

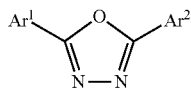 (III-O)

wherein $Ar^1$ and $Ar^2$ are independently $(C_1-C_{12})$alkyl, $(C_3-C_8)$cycloalkyl, $(C_3-C_8)$cycloalkyl-$(C_1-C_{12})$alkyl, para-$(C_1-C_{12})$alkylaryl, para-$(C_1-C_{12})$alkylheteroaryl, para-$(C_1-C_{12})$alkoxyaryl, or para-$(C_1-C_{12})$alkoxyheteroaryl groups, provided that only one of $Ar^1$ and $Ar^2$ is $(C_1-C_{12})$ alkyl.

14. The host-guest composition of claim 13 wherein for the host compound $Ar^1$ and $Ar^2$ are independently para-$(C_4-C_{12})$ alkylphenyl or para-$(C_4-C_{12})$alkoxyphenyl.

15. The host-guest composition of claim 1 wherein the host compound is

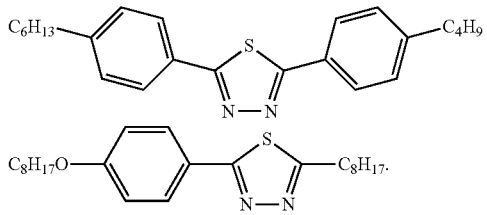

or

16. A ferroelectric liquid crystal mixture comprising the host-guest composition of claim 1.

17. A ferroelectric liquid crystal display comprising the host-guest composition of claim 1.

18. An electronic display device comprising the host-guest composition of claim 1, or the liquid crystal display of claim 17.

19. The display device of claim 18 wherein the device is comprised by a cell phone, a smart phone, a tablet, or a computer display screen.

20. The chiral host-guest composition of claim 2, wherein the weight percentage of the achiral host compound is 10% or more.

21. The chiral host-guest composition of claim 20, wherein the weight percentage of the chiral guest compound is 10% or more.

22. A chiral host-guest composition for a ferroelectric liquid crystal mixture, the host-guest composition comprising a chiral guest compound and an achiral host compound,
wherein the weight percentage of the achiral host compound is 10% or more,
wherein the chiral guest compound is a formula,

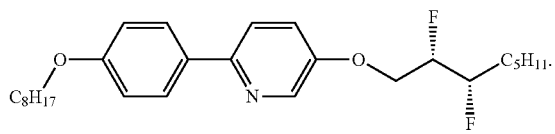

wherein the achiral host compound is a 2,5-disubstituted 1,3,4-thiadiasole or 1,3,4-oxadiazole.

23. A chiral host-guest composition for a ferroelectric liquid crystal mixture, the host-guest composition comprising a chiral guest compound and an achiral host compound,
wherein the weight percentage of the achiral host compound is 10% or more,
wherein the chiral guest compound is a formula,

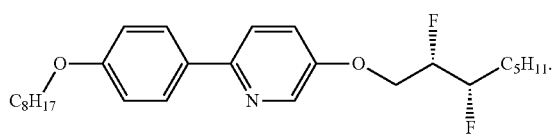

wherein the achiral host compound is

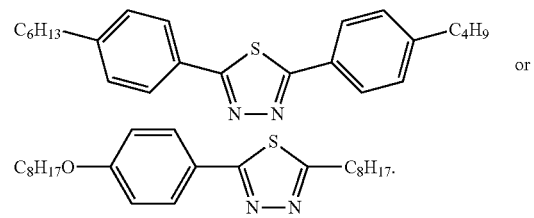

or

* * * * *